(12) United States Patent
Ogawa et al.

(10) Patent No.: US 8,697,240 B2
(45) Date of Patent: Apr. 15, 2014

(54) PHOTOCURABLE RESIN COMPOSITION AND CURED PRODUCT OF SAME, RESIN SHEET AND PRODUCTION METHOD FOR SAME, AND DISPLAY DEVICE

(75) Inventors: Yoshinobu Ogawa, Nagareyama (JP); Futoshi Oikawa, Noda (JP); Hiromasa Kawai, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 51 days.

(21) Appl. No.: 13/383,922

(22) PCT Filed: Jul. 15, 2010

(86) PCT No.: PCT/JP2010/061982
§ 371 (c)(1),
(2), (4) Date: Jan. 13, 2012

(87) PCT Pub. No.: WO2011/010599
PCT Pub. Date: Jan. 27, 2011

(65) Prior Publication Data
US 2012/0114953 A1    May 10, 2012

(30) Foreign Application Priority Data
Jul. 22, 2009   (JP) ................................ P2009-171200

(51) Int. Cl.
*B32B 27/40* (2006.01)
*B05D 3/06* (2006.01)
*C09D 135/02* (2006.01)

(52) U.S. Cl.
USPC ........... 428/423.1; 428/1.5; 522/95; 524/521; 427/508; 427/516

(58) Field of Classification Search
USPC ........... 428/1.5, 423.1; 522/95, 521; 427/508, 427/516
See application file for complete search history.

(56) References Cited

U.S. PATENT DOCUMENTS

| 7,824,740 B2 * | 11/2010 | Kawanishi .................... 427/508 |
| 2005/0202266 A1 | 9/2005 | Hase et al. |
| 2010/0273909 A1 * | 10/2010 | Ogawa et al. .................. 522/90 |

FOREIGN PATENT DOCUMENTS

| CN | 1666863 | 9/2005 |
| EP | 2 053 087 | 4/2009 |
| JP | 2001-316447 | 11/2001 |
| JP | 2004-109748 | 4/2004 |
| JP | 2004-359808 | 12/2004 |
| JP | 2006-309114 | 11/2006 |
| JP | 2008-56757 | 3/2008 |
| JP | 2008-248221 | 10/2008 |
| JP | 2009-24160 | 2/2009 |
| WO | WO 2008/016146 | 2/2008 |

OTHER PUBLICATIONS

Transmittal of the English Translation of the International Preliminary Report on Patentability dated Mar. 22, 2012, for International (PCT) Application No. PCT/JP2010/061982.
Korean Official Action dated Jul. 19, 2013, for KR Application No. 10-2012-7002280.
Chinese Official Action dated Jan. 30, 2013, for CN Application No. 201080032466.X.
Extended European Search Report dated Nov. 7, 2013, including Supplementary European Search Report and European Search Opinion, in EP Application No. 10802219.5-1304/2457935 (PCT/JP2010/061982).
Japanese Office Action issued on Oct. 29, 2013, in connection with Japanese Patent Application No. 2011-523620.

* cited by examiner

*Primary Examiner* — Thao T. Tran
(74) *Attorney, Agent, or Firm* — Antonelli, Terry, Stout & Kraus, LLP.

(57) ABSTRACT

A photocurable resin composition including: (A) a urethane (meth)acrylate oligomer having a polyoxyalkylene structure, (B) a (meth)acrylic polymer, (C) a (meth)acrylic monomer, and (D) a photopolymerization initiator, wherein the component (A) is produced using monomer components including (a1) a polyoxyalkylene polyol, (a2) a polyisocyanate, and (a3) a hydroxyl group-containing mono(meth)acrylate compound, a relationship $N (=n1/n2)$ between the total mass $n1$ of the monomer components and the total equivalent weight $n2$ of acryloyl groups within the all monomer components is 4,000 or greater, and the component (A) is substantially free of unreacted isocyanate groups.

16 Claims, No Drawings

PHOTOCURABLE RESIN COMPOSITION AND CURED PRODUCT OF SAME, RESIN SHEET AND PRODUCTION METHOD FOR SAME, AND DISPLAY DEVICE

TECHNICAL FIELD

The present invention relates to a photocurable resin composition and a cured product of the composition, a resin sheet and a production method for the sheet, and a display device.

BACKGROUND ART

In recent years, in the field of display devices comprising display members such as large flat panel displays and small lightweight displays, reductions in the thickness of the structural members and the direct bonding of front surface optical members to the display members have resulting in ongoing reductions in the thickness of display devices as well as improved contrast. However, in those cases where a thin display is used as a display member, and an optical member is bonded directly to the front surface of the display member, stress caused by expansion and contraction of each member and residual stress from the bonding results in the generation of internal stress, which tends to cause display irregularities within the display. Accordingly, in recent years, there has been much investigation of resin layer materials that can be interposed between the display member and the optical member.

For example, Patent Document 1 (JP 2001-316447 A) discloses, as a resin layer material, a soft composition comprising a polyol having a functionality of 2.4 to 3.0 and a molecular weight of 3,000 to 6,000, and a secondary or tertiary higher monoalcohol that functions as a tackifier, wherein the composition exhibits pressure-sensitive adhesiveness and has a rubber hardness of 30 or less. Because this soft composition utilizes a urethane reaction during the curing reaction, the process requires a considerable length of time, with a reaction at 100° C. for 2 hours followed by additional curing for 7 days, and therefore the process is suited to cast molding. However, the composition is not suitable for production methods that are more efficient than cast molding, such as thick sheet production methods in which the composition is applied continuously, without incorporating gas bubbles, to a film that functions as a substrate.

Patent Document 2 (JP 2004-359808 A) discloses, as a resin layer material, a transparent gel pressure-sensitive adhesive and sheet that are prepared by swelling a three dimensional cross-linked polymer with a liquid comprising a plasticizer and inorganic particles. However, because this pressure-sensitive adhesive and sheet contain a plasticizer, they tend to be prone to bleeding of the plasticizer, which can stain or corrode the bonded item such as the display member.

Patent Document 3 (JP 2006-309114 A) discloses, as a resin layer material, a pressure-sensitive adhesive sheet having a storage elastic modulus G' at a temperature of 23° C. and a frequency of 1 Hz within a range from $3 \times 10^5$ to $1 \times 10^7$ Pa. Considering the operating environment for a display device, the pressure-sensitive adhesive sheet preferably has an appropriate elastic modulus across a temperature range from 0° C. to 50° C. However, the above document makes no disclosure regarding the elastic modulus of the pressure-sensitive adhesive sheet under low-temperature conditions.

If the elastic modulus at low temperatures is high, then there is a possibility that when the display device is used in a low-temperature environment, the stress relaxation properties and the pressure-sensitive adhesiveness of the sheet may be unsatisfactory, thereby causing a problem. More specifically, if the above pressure-sensitive adhesive sheet is used for the display device of a mobile phone or the like, which tends to be more susceptible to air temperature effects, then the display tends to be prone to display irregularities in low-temperature environments, and detachment may occur at the pressure-sensitive adhesive sheet interface if the mobile phone is exposed to impact such as when the phone is dropped. Moreover, if the elastic modulus under high-temperature conditions of 50° C. or higher is too low, then strain within the various optical members cannot be satisfactorily suppressed, increasing the possibility that detachment or display irregularities or the like may occur.

In light of these circumstances, the inventors of the present invention have disclosed, in Patent Document 4 (JP 2008-56757 A), a sheet that uses a specific urethane (meth)acrylate oligomer composition. However, this sheet tends to suffer from a dramatic reduction in cohesive strength in high-temperature environments. As a result, in those cases where a plastic sheet such as an acrylic sheet is used as an optical member, thermal deformation of the plastic sheet may sometimes lead to lifting or detachment at the peripheral portions of the sheet.

As described above, although each of the disclosures for the resin layer material for a display device shows capabilities of improving display irregularities within the display device, none is capable of combining this improvement with requirements of mass productivity, anti-staining properties, low-temperature impact resistance and high-temperature reliability. Accordingly, a resin layer material that exhibits excellent stress relaxation properties and improves display irregularities, but also exhibits excellent anti-staining properties and has superior reliability under various operating conditions, as well as a method for producing such a resin layer material with good efficiency, have been keenly sought.

PRIOR ART DOCUMENTS

Patent Documents

Patent Document 1: JP 2001-316447 A
Patent Document 2: JP 2004-359808 A
Patent Document 3: JP 2006-309114 A
Patent Document 4: JP 2008-56757 A

DISCLOSURE OF INVENTION

Problems Invention Aims to Solve

The present invention has been developed in light of the above circumstances, and has an object of providing a pressure-sensitive adhesive sheet which can be used for bonding a display member and a front surface optical member for a thin display or the like, and which, under a wide range of temperature conditions, exhibits minimal stress resulting from the expansion and contraction of each member and minimal internal stress caused by residual stress during bonding, and is capable of suppressing display irregularities within the display, as well as providing a material for the pressure-sensitive adhesive sheet.

Means for Solution of the Problems

As a result of intensive research, the inventors of the present invention discovered that an acrylic photocurable resin composition comprising a specific urethane (meth)acrylate oligomer was a suitable material for forming a sheet that exhibits excellent stress relaxation properties, has minimal display irregularities, and exhibits superior levels of tack strength, transparency, and reliability under a variety of conditions, and they were therefore able to complete the present invention.

In other words, a photocurable resin composition according to the present invention is used for forming a resin layer within a display device comprising a display member and an optical member disposed on the front surface of the display member with the resin layer interposed therebetween, wherein the photocurable resin composition comprises: (A) a urethane (meth)acrylate oligomer having a polyoxyalkylene structure, (B) a (meth)acrylic polymer, (C) a (meth)acrylic monomer, and (D) a photopolymerization initiator, the component (A) is produced using three or more monomer components including (a1) at least one polyoxyalkylene polyol, (a2) at least one polyisocyanate, and (a3) at least one hydroxyl group-containing mono(meth)acrylate compound, a relationship N between the total mass n1 of the three or more monomer components and the total equivalent weight n2 of acryloyl groups within the three or more monomer components satisfies the formula shown below, and $$4000 \leq N(=n1/n2) \quad \text{Formula (I)}$$

the component (A) is substantially free of unreacted isocyanate groups.

The component (B) preferably comprises a (meth)acrylic polymer having a carboxyl group, and the component (C) preferably comprises a (meth)acrylic monomer having a carboxyl group. The component (A) is preferably a mixture of a urethane (meth)acrylate oligomer having one (meth)acryloyl group, and a urethane (meth)acrylate oligomer having two or more (meth)acryloyl groups.

The component (B) is preferably a (meth)acrylic polymer having a weight-average molecular weight within a range from $10 \times 10^4$ to $200 \times 10^4$. Further, the component (B) is preferably a copolymer obtained by polymerization of a monomer mixture comprising (b1) (meth)acrylic acid and (b2) a (meth)acrylate ester. The monomer mixture preferably comprises from 5 to 45 mol % of the (meth)acrylic acid (b1).

The component (C) is preferably a monomer mixture comprising (c1) (meth)acrylic acid and (c2) a (meth)acrylate ester. This monomer mixture preferably comprises from 5 to 45 mol % of the (meth)acrylic acid (c1). The monomer mixture that is used for forming the component (B), and the component (C) preferably comprise the same type of compounds.

The photocurable resin composition of the present invention preferably comprises the above-mentioned components (A), (B) and (C) in a ratio of 1 to 50% by mass of the component (A), 5 to 40% by mass of the component (B), and 5 to 85% by mass of the component (C), based on the total mass of the three components, and preferably comprises the component (D) in an amount of 0.1 to 20 parts by mass per 100 parts by mass of the combination of components (A), (B) and (C).

A cured product according to the present invention is obtained by photocuring the photocurable resin composition described above, and has storage elastic modulus values and loss elastic modulus values at various temperatures that simultaneously satisfy the ranges specified in (1) to (3) below.

(1) At 70° C., a storage elastic modulus within a range from $1 \times 10^3$ to $1 \times 10^6$ Pa and a loss elastic modulus within a range from $1 \times 10^3$ to $1 \times 10^6$ Pa.

(2) At 23° C., a storage elastic modulus within a range from $1 \times 10^4$ to $5 \times 10^6$ Pa and a loss elastic modulus within a range from $1 \times 10^4$ to $5 \times 10^6$ Pa.

(3) At 0° C., a storage elastic modulus within a range from $5 \times 10^4$ to $1 \times 10^7$ Pa and a loss elastic modulus within a range from $5 \times 10^4$ to $1 \times 10^7$ Pa.

A resin sheet member according to the present invention is used for forming a resin layer within a display device comprising a display member and an optical member disposed on the front surface of the display member with the resin layer interposed therebetween, wherein the sheet member comprises a first film, a resin sheet formed from an above-mentioned cured product, which is provided on top of the first film, and a second film provided on top of the resin sheet. The first film and the second film are both release-treated plastic films, wherein the respective release force values for the first and second films are preferably different.

A method for producing a resin sheet member according to the present invention is used for producing a resin sheet member used for forming a resin layer within a display device comprising a display member and an optical member disposed on the front surface of the display member with the resin layer interposed therebetween, wherein the method comprises a step of applying the above-described photocurable resin composition in a sheet-like manner to one surface of a first film and subsequently covering the composition with a second film, and a step of curing the photocurable resin composition by irradiating light through the principal surface of at least one of the first film and the second film. In the curing step, the irradiated light is preferably ultraviolet light having a peak wavelength of 365 nm and comprising substantially no wavelengths less than 280 nm, and this ultraviolet light is preferably irradiated for at least two minutes at an intensity of 0.01 to 20.0 mW/cm².

A display device according to the present invention comprises a display member, and an optical member disposed on the front surface of the display member with a resin layer interposed therebetween, wherein the resin layer comprises a cured product of the above photocurable resin composition.

The present application is based upon and claims the benefit of priority from prior Japanese Application 2009-171200 filed on Jul. 22, 2009, the entire content of which are incorporated herein by reference.

Effect of the Invention

The present invention is able to provide a photocurable resin composition that is suitable as a material for a resin layer within a display device comprising a display member and an optical member that is disposed on the viewed side, namely the front surface, of the display member with the resin layer interposed therebetween. Further, by using the photocurable resin composition according to the present invention, a resin sheet can be provided that exhibits excellent stress relaxation properties, can be designed with a wide range of tack strength values, contains no gas bubbles or the like, exhibits excellent transparency, and also offers superior anti-staining properties and productivity. Furthermore, by using such a resin sheet, a thin display device can be produced in which display irregularities are suppressed and which offers excellent reliability under various operating environments. A display device according to the present invention uses no secondary items such as plasticizers within the sheet material, and therefore staining of the bonded items is suppressed, and the device exhibits excellent reliability over long periods of use.

BEST MODE FOR CARRYING OUT THE INVENTION

Each of the components that constitute the photocurable resin composition according to the present invention is described below.

Component (A)

The urethane (meth)acrylate oligomer having a polyoxyalkylene structure that represents the component (A) in the photocurable resin composition of the present invention is produced using three or more monomer components including (a1) at least one polyoxyalkylene polyol, (a2) at least one polyisocyanate, and (a3) at least one hydroxyl group-containing mono(meth)acrylate compound, wherein the relationship N (=n1/n2) between the total mass n1 of the three or more monomer components and the total equivalent weight n2 of acryloyl groups within the three or more monomer components satisfies the formula shown below, and $$4000 \leq N(=n1/n2) \qquad \text{Formula (I)}$$

the component (A) is substantially free of unreacted isocyanate groups.

In this manner, by reacting at least the monomer components (a1) to (a3) in a specific ratio that ensures that the relationship of formula (I) is satisfied, the molecular weight and the average number of acryloyl functional groups within the oligomer that is used as the component (A) can be appropriately controlled.

Component (a1)

The polyoxyalkylene polyol of the component (a1) used in the present invention is a compound containing two or more hydroxyl groups within each molecule, and may also be referred to as a polyether polyol. This type of compound can be obtained, for example, by using a compound having two or more active hydrogens within each molecule as an initiator, such as a polyhydric alcohol, a polyhydric phenol or an amine, and performing an addition polycondensation of an alkylene oxide compound with this initiator. The compound having two or more active hydrogens within each molecule that is used as the initiator may be an aliphatic, alicyclic or aromatic compound. The alkylene oxide compound is preferably a compound of 2 to 4 carbon atoms.

Specific examples of the component (a1) include polyethylene glycol, polypropylene glycol, polybutylene glycol and tetramethylene glycol. Further, copolymers formed from two or more of these compounds such as copolymers of ethylene oxide and propylene oxide or copolymers of ethylene oxide and tetrahydrofuran can also be used favorably.

Difunctional and/or trifunctional or higher compounds may be used individually or in mixtures as the polyoxyalkylene polyol (a1). The number of functional groups is determined by the initiator used during synthesis of the polyoxyalkylene polyol, namely the above-mentioned compound having two or more active hydrogens within each molecule, such as a polyhydric alcohol, polyhydric phenol or polyvalent amine, and synthesis methods using this type of initiator are well known. For example, a difunctional polyol can be obtained by using a diol such as ethylene glycol, diethylene glycol, propylene glycol, dipropylene glycol, neopentyl glycol, 1,4-butanediol or 1,6-hexanediol as an initiator, and adding an alkylene oxide to this initiator. Further, a trifunctional or higher polyol can be obtained by using a compound such as glycerol, trimethylolpropane, pentaerythritol or sorbitol as an initiator, and adding an alkylene oxide to this initiator. Of the various compounds that can be used as initiators, diols and triols of 2 to 4 carbon atoms are preferred, and ethylene glycol, propylene glycol and glycerol are particularly desirable. A single polyoxyalkylene polyol may be used alone as the component (a1), or a plurality of different polyoxyalkylene polyols may be used in combination. Moreover, a plurality of polyoxyalkylene polyols having different numbers of hydroxyl groups within the molecule may also be used in combination.

Among the various polyoxyalkylene polyols that can be used as the component (a1), from the viewpoints of achieving superior suppression of display irregularities and superior stress relaxation properties, compounds having a number-average molecular weight within a range from 1,000 to 20,000 are particularly desirable. Further, the polyoxyalkylene polyol (a1) is preferably a compound that is liquid under the reaction temperature conditions described below. In this description, the "number-average molecular weight" of the polyoxyalkylene polyol is a value calculated on the basis of the hydroxyl value (OHv, units: mgKOH/g) using the formula shown below.

Number-average molecular weight=(56,100/OHv)× average number of functional groups per molecule The "hydroxyl value" is a value measured in accordance with JIS K1557 6.4.

From the viewpoints of transparency and particularly moisture and heat resistance, the polyoxyalkylene polyol (a1) preferably comprises an ethylene oxide unit as a copolymer component. The polymerization mode for the ethylene oxide may be either random copolymerization or block copolymerization. The copolymerization ratio of the ethylene oxide component, based on the weight of the polyoxyalkylene polyol within the component (A), is typically a weight ratio of 3% to 60%, and preferably 5% to 40%. If the copolymerization ratio of the ethylene oxide component is less than 3%, then the moisture and heat resistance tends to deteriorate. More specifically, if a moisture and heat resistance test is performed by leaving the cured product to stand for 7 days in a moist heat condition at a temperature of 50° C. and a relative humidity of 95%, then maintaining a degree of transparency that is satisfactory to enable the composition to be used as a resin layer material for a display device is problematic, and haze (cloudiness) may occur. On the other hand, if the above-mentioned copolymerization ratio exceeds 60%, then the cured product may become overly hard, and satisfactory stress relaxation properties may be unobtainable when the cured product is used as a resin layer material.

Component (a2)

The polyisocyanate of the component (a2) used in the present invention may be an aromatic, alicyclic or aliphatic polyisocyanate having two or more isocyanate groups, a mixture of two or more such compounds, or a modified polyisocyanate obtained by modifying such a compound. Among the above polyisocyanate compounds, a diisocyanate compound having two isocyanate groups is preferred.

Specific examples of the polyisocyanate include polyisocyanate compounds such as tolylene diisocyanate (TDI), 4,4'-diphenylmethane diisocyanate (MDI), polymethylene polyphenyl isocyanate (crude MDI), 1,5-naphthylene diisocyanate (NDI), tolidine diisocyanate (TODI), xylylene diisocyanate (XDI), trimethylxylylene diisocyanate (TMXDI), isophorone diisocyanate (IPDI), hexamethylene diisocyanate (HDI), norbornene diisocyanate (NBDI) and hydrogenated MDI, as well as prepolymer-modified, nurate-modified, urea-modified and carbodiimide modified products thereof. Among these compounds, from the viewpoints of resistance to discoloration and suppression of display irregularities, aliphatic diisocyanates having 3 to 9 carbon atoms, such as hexamethylene diisocyanate (HDI), and alicyclic diisocyanates such as isophorone diisocyanate (IPDI), hydrogenated XDI and hydrogenated MDI are preferred.

Component (a3)

The hydroxyl group-containing mono(meth)acrylate of the component (a3) used in the present invention is preferably an ester of a (meth)acrylic acid and an aliphatic, alicyclic or aromatic diol. Esters of a (meth)acrylic acid and an alkanediol having 1 to 8 carbon atoms are particularly desirable. Specific examples include 2-hydroxyethyl (meth)acrylate, 2-hydroxypropyl (meth)acrylate, 4-hydroxybutyl (meth)acrylate, polyethylene glycol mono(meth)acrylate (wherein on average n=2 to 10), polypropylene glycol mono(meth)acrylate (wherein on average n=2 to 10), and 2-hydroxy-3-phenyloxypropyl (meth)acrylate. Moreover, compounds such as polycaprolactone acrylate and hydroxyl group-containing alicyclic acrylates may also be used without any particular limitations, provided they have sufficient compatibility to ensure turbidity does not occur within the photocurable composition.

The component (A) in the present invention is produced using essentially the three components (a1), (a2) and (a3) described above, but other monomer components may also be used in combination with these three components if required, provided they do not impair the effects achieved by the oligomer of the component (A). For example, a monool may be used to adjust the number of functional groups taking part in the reaction. A monool is a compound comprising one hydroxyl group within each molecule, and specific examples thereof include polyalkylene monools obtained by substituting one or two of the hydroxyl groups that exist within the compounds described above for the component (a1) with hydrogen atoms.

Further, other monool compounds such as acrylic monools, castor oil-based monools, and natural or synthetic monoalcohols may also be used in combination with the above three components. Specifically, acrylic monools may be acrylic polymers having one hydroxyl group within each molecule. Castor oil-based monools may be higher monools having 18 carbon atoms prepared from ricinoleic acid, which is a hydrolysate of castor oil. Natural or synthetic monoalcohols may be monofunctional alcohols having 6 or more carbon atoms, and preferably 6 to 30 carbon atoms. Specific examples of these monoalcohols include 2-ethylhexyl alcohol, sec-stearyl alcohol, α-terpineol, diacetone alcohol and capryl alcohol. The number average molecular weight of the monool is preferably within a range from 100 to 10,000. The number average molecular weight of the monool may be determined using the same method as that used for the polyoxyalkylene polyol (a1).

A conventional silane coupling agent may also be used as a monomer component in the preparation of the component (A) of the present invention. Silane coupling agents are silane-based compounds having a so-called coupling action, and examples include silane-based compounds having an active hydrogen group that reacts with an isocyanate group. Silane coupling agents that can be used favorably in the present invention have an alkoxysilyl group at one terminal and an active hydrogen group such as a mercapto group or amino group at the other terminal. Silane coupling agents having an alkoxysilyl group at one terminal and a mercapto group at the other terminal are particularly desirable.

In those cases where monomer components besides the components (a1), (a2) and (a3) described above are used in combination with the components (a1), (a2) and (a3) during the preparation of the component (A), the amount of these other monomer components used in combination, reported as a molar ratio relative to the amount of the component (a3), is preferably 1.5 or less, and more preferably within a range from 0.2 to 1. If the amount of these other monomer components exceeds the molar ratio of 1.5, then the fundamental properties provided by the component (A) tend to deteriorate, and achieving a good balance between suppression of display irregularities, pressure-sensitive adhesiveness and anti-staining properties tends to become problematic.

In the photocurable resin composition of the present invention, in order to achieve the effects provided by the oligomer of the component (A), the molecular weight of the oligomer and the average number of acryloyl functional groups within each molecule must be controlled appropriately. If the molecular weight of the oligomer is too small, then the tack strength tends to be weak, and the pressure-sensitive adhesiveness is inadequate for applications that require powerful pressure-sensitive adhesiveness. On the other hand, if the molecular weight is too large, then the viscosity of the oligomer becomes overly high, and the handling properties and workability tend to deteriorate.

Further, in the reaction for preparing the component (A), the average number of acryloyl functional groups accompanied by the urethanization reaction is set to a maximum of 2, with the value varying depending on the variety of monomer components used and the relative proportions of those components. If the average number of acryloyl functional groups is too small, then the cohesive force at high temperature tends to be unsatisfactory, and urethane components tend to bleed out of the cured product. On the other hand, as the average number of acryloyl functional groups approaches 2, the peel adhesive strength tends to deteriorate.

Accurately specifying the molecular weight and functionality of the obtained oligomer by measurement is difficult. Accordingly, although not a strict specification, a representative value for the number-average molecular weight of the oligomer used as the component (A) is preferably within a range from 10,000 to 300,000, and more preferably from 30,000 to 200,000. Further, a representative value for the average number of functional groups in the oligomer is preferably within a range from 0.7 to 1.8.

In the present invention, in the preparation of the component (A), by reacting the three or more monomer components, including the essential components (a1), (a2) and (a3) described above, in a ratio such that the relationship N (=n1/n2) between the total mass n1 of the three or more monomer components and the total equivalent weight n2 of acryloyl groups within those monomer components satisfies the formula shown below:

$$4000 \leq N(=n1/n2) \qquad \text{Formula (I)}$$

the molecular weight and the average number of functional groups of the resulting oligomer can be controlled appropriately.

As shown in formula (I), the value of N (=n1/n2) that indicates the quantitative relationship between the monomer components used in the preparation of the component (A) is preferably at least 4,000, and is more preferably 8,000 or greater, and still more preferably 10,000 or greater. By appropriately adjusting the monomer mixture so that the value of n1/n2 is at least 4,000, the peel adhesive strength can be increased with ease. On the other hand, although there are no particular limitations on the upper limit for the value of n1/n2, if due consideration is given to the deterioration in handling associated with viscosity increase and the like, then the effective upper limit is approximately 10,000 to 100,000.

The urethane (meth)acrylate oligomer used as the component (A) in the present invention is preferably substantially free of unreacted isocyanate groups. In this description, "substantially free of" means the urethane (meth)acrylate oligomer is either completely free of unreacted isocyanate groups (meaning no unreacted isocyanate groups can be detected), or contains a trace amount of unreacted isocyanate groups, but the amount is sufficiently small as to not impair the effects of the present invention, and specifically the optical qualities such as the transparency and smoothness.

The concentration of the unreacted isocyanate groups that exist in the oligomer is preferably 0.3% by mass or less, and is most preferably 0. If the oligomer contains a substantial amount of unreacted isocyanate groups, it tends to swell as a result of carbon dioxide gas generated by reaction with moisture or the like, resulting in a deterioration in the optical qualities such as the transparency, smoothness and gas bubble incorporation, and increasing the likelihood of lifting at the bonding interface. As described above, the urethane reaction can be executed completely, or at least almost completely, using known techniques, and therefore when the amounts added of the respective components are stoichiometric amounts that satisfy the above formula (I), and these components are completely or at least almost completely reacted, the resulting oligomer can be produced substantially free of unreacted isocyanate groups. Determination as to whether or not unreacted isocyanate groups exist within the final composition, the products of the various reaction steps, or the oligomer can be made, for example, using the method described in the following examples, on the basis of whether or not an isocyanate group absorption ($2250\ cm^{-1}$) can be confirmed in the infrared absorption spectrum.

In the present invention, preparation of the component (A) may be performed by reacting the three essential components (a1), (a2) and (a3) either simultaneously (one-shot method) or sequentially. In order to ensure reliable production of the desired urethane (meth)acrylate oligomer as the main product, a sequential reaction in which at least one of these components is reacted sequentially is preferred. In those cases where the oligomer is prepared by sequential reaction, various methods may be employed. For example, one of the methods (I) to (III) described below may be applied.

(I) A method comprising: a step of reacting the component (a2) with an excess of the component (a1) to obtain a prepolymer having hydroxyl groups at the terminals, a step of separately reacting the component (a2) and the component (a3) in a 1:1 molar ratio to obtain a (meth)acryloyl-modified isocyanate compound, and following completion of these steps, a step of reacting the obtained prepolymer and the obtained (meth)acryloyl-modified isocyanate compound.

(II) A method comprising: a step of reacting the component (a1) with an excess of the component (a2) to obtain a prepolymer having isocyanate groups at the terminals, a step of reacting the obtained prepolymer with the component (a3) to convert a portion of the isocyanate groups within the prepolymer to (meth)acryloyl groups, and if necessary, a step of reacting the remaining isocyanate groups with a monool component as the component (a1).

(III) A method comprising: a step of reacting the component (a1) with an excess of the component (a2) to obtain a prepolymer having isocyanate groups at both terminals, a step of reacting the obtained prepolymer with the component (a3) to obtain a prepolymer 1 having an isocyanate group at one terminal, a step of separately reacting the component (a2) with an excess of the component (a1) to obtain a prepolymer 2 having hydroxyl groups at both terminals, and a step of reacting the prepolymer 1 and the prepolymer 2.

Regardless of which of the above methods is applied, the components are preferably finally reacted with a desired ratio of excess hydroxyl groups. The sequential reaction is not limited to the methods described above.

The various urethanization reactions (namely, the condensation reactions between the isocyanate groups of the component (a2) and the hydroxyl groups of the other components) are performed under heating from normal temperature to 110° C. However, if necessary, a conventional catalyst may be used to regulate the reaction rate. Representative examples of the catalyst include organometallic compounds containing a metal such as tin, lead or titanium, and tertiary amine-based compounds such as triethylamine and triethylenediamine.

Among these catalysts, organotin compounds are preferred, and typical examples include dibutyltin dilaurate, dioctyltin dilaurate, dibutyltin dioctoate, dibutyltin diacetate, dibutyltin maleate, dibutyltin mercaptopropionate, dibutyltin bis(isooctyl thioglycolate), dibutyltin dodecylmercaptide, tin 2-ethylhexanoate, stannous octoate and stannous oleate. The amount used of the catalyst may be selected appropriately to enable suitable regulation of the reaction rate between the isocyanate groups and the hydroxyl groups. Although there are no particular limitations on the amount of the catalyst, in most cases the amount is preferably within a range from 0.001 to 10% by weight relative to the total weight of all the components used as raw materials.

In the urethanization reaction ((meth)acrylation reaction) of the hydroxyl group-containing (meth)acrylate used as the component (a3), in order to prevent gelation caused by radical polymerization during the reaction, it is preferable that a polymerization inhibitor is added to the reaction mixture, typically in an amount of 50 to 2,000 ppm. Specific examples of polymerization inhibitors that can be used in the present invention include hydroquinone, hydroquinone monomethyl ether, p-methoxyphenol and p-benzoquinone. Further, the reaction temperature for the (meth)acrylation reaction is typically within a range from normal temperature to 100° C., and preferably from 50 to 85° C.

The reaction mixture obtained in each of the above urethanization reactions generally contains a plurality of urethane (meth)acrylate oligomers as the main component, but may also contain by-products. However, in the present invention, by reacting the various monomer components that are used as raw materials in a ratio that satisfies the above formula (I), oligomers having an appropriate molecular weight and average number of functional groups can be obtained as the main component.

The above urethane (meth)acrylate oligomer (reaction mixture) that is used as the component (A) in the present invention is preferably substantially free of unreacted isocyanate groups. Accordingly, the above urethanization reaction is preferably continued until no unreacted isocyanate groups exist within the reaction mixture. A determination as to whether or not unreacted isocyanate groups exist within the reaction mixture can be made by sampling a portion of the reaction mixture, and then measuring the infrared absorption spectrum of the sample to confirm whether or not the spectrum includes an isocyanate group absorption. The various urethanization reactions are usually completed within a reaction time of approximately 1 to 6 hours, but this reaction time varies depending on conditions such as the reaction temperature.

Component (B)

The component (B) in the photocurable resin composition of the present invention is a (meth)acrylic polymer, and this component has the effects of imparting the resin composition and the resulting sheet with pressure-sensitive adhesiveness and improving the reliability of the pressure-sensitive adhesive properties under high-temperature conditions. There are no particular limitations on the (meth)acrylic polymer used as the component (B), and any polymer obtained by polymerizing a (meth)acrylic monomer compound may be used. However, in terms of improving the reliability of the pressure-sensitive adhesive properties under high-temperature conditions, a polymer having a weight-average molecular weight within a range from $10\times10^4$ to $200\times10^4$ is preferred. In this description, the "weight-average molecular weight" refers to the value measured by gel permeation chromatography and referenced against standard polystyrenes.

In the present invention, the component (B) preferably contains carboxyl groups within the polymer molecule. In one embodiment, a preferred component (B) of the present invention is obtained by polymerizing a (meth)acrylic monomer mixture containing (b1) a (meth)acrylic monomer having a carboxyl group as an essential component, using a conventional method such as solution polymerization.

Specific examples of the (meth)acrylic monomer (b1) having a carboxyl group include acrylic acid, methacrylic acid, itaconic acid, maleic acid, fumaric acid and crotonic acid. Among these, from the viewpoint of polymer synthesis, acrylic acid or methacrylic acid is preferred. Assuming use of the photocurable resin composition as a resin layer material within a display device, the (meth)acrylic monomer (b1) having a carboxyl group preferably represents a proportion of 3 to 50 mol %, and more preferably 5 to 45 mol %, of the total monomer mixture used in the production of the component (B). Ensuring that the proportion of the component (b1) within the component (B) satisfies the range described above facilitates a favorable combination of tack durability for the display device under high-temperature conditions and suppression of display irregularities.

There are no particular limitations on other monomers (b2) that can be copolymerized with the (meth)acrylic monomer (b1) having a carboxyl group, but (meth)acrylate esters are preferred. In one preferred embodiment of the present invention, the component (B) is an acrylic copolymer obtained by polymerizing a monomer mixture comprising (b1) (meth)acrylic acid and (b2) a (meth)acrylate ester, wherein the monomer mixture preferably comprises 3 to 50 mol %, and more preferably 5 to 45 mol %, of the component (b1). Among the various (meth)acrylate esters for the component (b2), compounds having an alkyl group or hydroxyalkyl group of 1 to 20 carbon atoms in the ester portion are preferred.

Specific examples of these compounds include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate and stearyl (meth)acrylate. Any of these compounds may be used individually, or two or more compounds may be used in combination.

On the other hand, examples of (meth)acrylate compounds having a hydroxyl group include alkylene oxide adducts of (meth)acrylic acid, dehydration condensation products of polyhydric alcohols and (meth)acrylic acid and derivatives formed using such products as starting raw materials, and (meth)acrylic acid adducts of epoxy group-containing compounds.

Specific examples of these compounds include mono (meth)acrylates of alkanediols having 1 to 8 carbon atoms, such as hydroxyethyl (meth)acrylate, hydroxypropyl (meth)acrylate, hydroxybutyl (meth)acrylate, hydroxypentyl (meth)acrylate, hydroxyhexyl (meth)acrylate, hydroxyheptyl (meth)acrylate and hydroxyoctyl (meth)acrylate; mono (meth)acrylates of alkanepolyols having 1 to 8 carbon atoms and di(meth)acrylates of alkanepolyols, such as alkanetriol mono(meth)acrylates, alkanetriol di(meth)acrylates, alkanetetraol mono(meth)acrylates, alkanetetraol di(meth)acrylates, alkanepentaol mono(meth)acrylates, alkanepentaol di(meth)acrylates, alkanehexaol mono(meth)acrylates and alkanehexaol di(meth)acrylates; as well as polyether poly (meth)acrylates and polyalkylene glycol mono(meth)acrylates such as diethylene glycol mono(meth)acrylate, dipropylene glycol mono(meth)acrylate, triethylene glycol mono (meth)acrylate and tetraethylene glycol mono(meth)acrylate.

Component (C)

The (meth)acrylic monomer used as the component (C) in the present invention may be any known (meth)acrylic compound. Although there are no particular limitations, the component (C) used in the present invention preferably comprises a (meth)acrylic monomer having a carboxyl group. Specific examples include the various compounds listed above as monomer components for forming the component (B). If the assumption is made that the photocurable resin composition is to be used as a resin layer material within a display device, then in view of tack durability under high-temperature conditions, a (meth)acrylic monomer (c1) having a carboxyl group preferably accounts for 3 to 50 mol %, and more preferably 5 to 45 mol %, of all of the monomers that constitute the component (C). In one preferred embodiment of the present invention, the component (C) is a monomer mixture comprising (c1) (meth)acrylic acid and (c2) a (meth)acrylate ester, wherein the monomer mixture preferably comprises 3 to 50 mol %, and more preferably 5 to 45 mol %, of the component (c1).

In one preferred embodiment of the present invention, the monomer mixture used in forming the component (B) and the monomer mixture of the component (C) comprise the same type of compounds. One such example is the case where an acrylic rubber obtained by polymerizing acrylic acid and 2-ethylhexyl acrylate is used as the component (B), and a mixture of acrylic acid and 2-ethylhexyl acrylate is use as the component (C).

In the present invention, in addition to the carboxyl group-containing (meth)acrylates described above, other acrylic compounds such as hydroxyl group-containing (meth)acrylate compounds may also be used in combination as the component (C). Including a hydroxyl group-containing (meth)acrylate within the component (C) of the resin composition imparts the composition with antifogging properties under moist heat conditions such as a temperature of 50° C. and a relative humidity of 95%, and is consequently preferred. The amount added of the hydroxyl group-containing (meth)acrylate compound is preferably within a range from 1 to 30% by mass, and more preferably 3 to 20% by mass, relative to the total mass of the components (A), (B) and (C) within the photocurable resin composition of the present invention. If the amount added is less than 1% by mass, then the antifogging properties of the component (A) under moist heat conditions may be unsatisfactory. In contrast, if the amount added exceeds 30% by weight, then a deterioration may be observed in certain physical properties of the cured product such as the flexibility and toughness. Specific examples of the hydroxyl group-containing (meth)acrylate compound include the same compounds as those listed above as potential monomer components for forming the component (B).

The component (B) and the component (C) described above may be used as independent raw materials during preparation of the composition, but the two components are preferably mixed in advance in the form of an acrylic syrup, as this improves the compatibility of the components. The acrylic syrup can be obtained either by dissolving the (meth) acrylic polymer of the component (B), which has been prepared in advance by a polymerization reaction, in the (meth)

acrylic monomer of the component (C), or by halting the polymerization reaction of the (meth)acrylic monomer components at an intermediate stage.

Although there are no particular limitations on the ratio between the component (B) and the component (C) in the acrylic syrup, the amount of the component (C) is typically within a range from 50 to 2,000 parts by weight per 100 parts by weight of the polymer compound of the component (B). As described above, the weight-average molecular weight of the component (B) within the acrylic syrup is preferably within a range from $10 \times 10^4$ to $200 \times 10^4$. Further, the acrylic syrup preferably comprises a monomer and/or polymer of a carboxyl group-containing compound. The proportion of the monomer and/or polymer of a carboxyl group-containing compound is preferably within a range from 3 to 60 mol %, and more preferably from 5 to 55 mol %, of the total acrylic syrup.

In the photocurable resin composition of the present invention, ensuring that the blend proportions of the above-mentioned components (A), (B) and (C), based on the total mass of the three components, are from 1 to 50% by mass of the component (A), from 5 to 40% by mass of the component (B), and from 5 to 85% by mass of the component (C) is preferred in terms of achieving both properties of suppression of display irregularities and tack durability under high-temperature conditions. Moreover, using blend proportions of (A) 5 to 30% by mass, (B) 10 to 20% by mass, and (C) 50 to 85% by mass is preferred in terms of achieving all properties of suppression of display irregularities, tack durability under high-temperature conditions, and a favorable viscosity for the coating liquid, namely handling properties for the coating liquid. Furthermore, the monomer component used in preparing the (meth)acrylic polymer of the component (B), and the (meth)acrylic monomer used as the component (C) are preferably the same type of compound. Further, using a carboxyl group-containing (meth)acrylic monomer and an alkyl (meth)acrylate as the component (C), and a polymer obtained by polymerizing a monomer mixture containing the same compounds as the component (B) is preferred in terms of obtaining superior transparency.

Component (D)

The photopolymerization initiator used as the component (D) in the present invention may be any conventional compound that can be used for initiating photopolymerization of vinyl-based monomers. Specific examples of compounds that can be used as the photopolymerization initiator include α-hydroxyisobutylphenone, benzoin, isopropyl benzoin ether, isobutyl benzoin ether, benzophenone, Michler's ketone, chlorothioxanthone, dodecylthioxanthone, dimethylthioxanthone, diethylthioxanthone, acetophenone diethyl ketal, benzyl dimethyl ketal, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, 2-methyl-1-[4-(methylthio)phenyl]-2-morpholinopropan-1-one, 2-benzyl-2-dimethylamino-1-(4-morpholinophenyl)-butanone-1, bis(2,4,6-trimethylbenzoyl)-phenylphosphine oxide, bis(2,4,6-trimethylbenzoyl)-diphenylphosphine oxide, and a mixture of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester.

The photopolymerization initiator is typically selected with due consideration of the absorption properties of the light irradiation device, and in the present invention, is preferably benzyl dimethyl ketal, 1-hydroxycyclohexyl phenyl ketone, or 2-hydroxy-2-methyl-1-phenylpropan-1-one, although there are no particular limitations. In the resin composition according to the present invention, there are no particular limitations on the amount added of the component (D). However, generally, in those cases where internal curability is insufficient, unreacted components may migrate to the surface of the cured product over time, causing stickiness, and therefore the amount added of the photopolymerization initiator is required to be adjusted appropriately to prevent such stickiness from occurring. In one embodiment of the photocurable resin composition according to the present invention, the amount added of the component (D) is preferably within a range from 0.1 to 20 parts by mass, and more preferably from 0.5 to 5 parts by mass, per 100 parts by mass of all the photocurable components within the composition, namely per 100 parts by mass of the combination of the components (A), (B) and (C).

(Other Components)

The photocurable resin composition according to the present invention may, where necessary, include other components in addition to the essential components (A) to (D) described above. In particular, in those cases where the present invention is used to prepare a sheet member for use as a resin layer material, a tackifier may be added to the resin composition to improve the pressure-sensitive adhesiveness of the sheet.

In this description, a "tackifier" describes a resin that is used for imparting pressure-sensitive adhesiveness, and any tackifier that dissolves transparently in the resin composition of the present invention may be used. Although there are no particular limitations on the tackifier, specific examples of tackifiers that can be used in the present invention include gum rosin, tall rosin, wood rosin, disproportionated rosin, polymerized rosin, glycerol esters and pentaerythritol esters of these rosins, rosin-based resins such as hydrogenated products of the above rosins, terpene resins, hydrocarbon-modified terpene resins, terpene-based resins such as hydrogenated products of these terpene resins, terpene phenolic resins, terpene phenol-based resins such as hydrogenated products of terpene phenolic resins, petroleum resins such as aliphatic petroleum resins, alicyclic petroleum resins, aromatic petroleum resins, copolymer petroleum resins, dicyclopentadiene-based petroleum resins, pure monomer petroleum resins and hydrogenated products of these petroleum resins, as well as styrene-based resins, coumarone-indene-based resins, alkylphenol-based resins, xylene-based resins, dammar, copal, and shellac. In those cases where these types of tackifiers are used, the amount used of the tackifier is preferably within a range from 1 to 20% by weight relative to the total mass of the photocurable resin composition.

The other components are not limited to the tackifier described above, and if necessary, the photocurable resin composition of the present invention may also include any of the conventional components typically used in the field of polyurethane technology. Examples of these components include catalysts that contribute to the urethanization reaction, and various additives such as age inhibitors, antifoaming agents and flame retardants.

Examples of the above age inhibitors include hindered phenol-based, benzotriazole-based and hindered amine-based age inhibitors such as butylated hydroxytoluene (BHT) and butylhydroxyanisole (BHA).

Examples of the above flame retardants include chloroalkyl phosphate, dimethyl-methyl phosphate, ammonium polyphosphate, neopentyl bromide-polyether, brominated polyether, and bromine and phosphorus compounds. Examples of the above antifoaming agents include Disparlon OX-710 (product name, manufactured by Kusumoto Chemicals, Ltd.).

There are no particular limitations on the concentration of these additives, provided they do not impair the properties of the resin composition according to the present invention. Typically, the additives are used in an amount that is 10% by weight or less, and more preferably 5% by weight or less, relative to the total mass of the photocurable resin composition.

The photocurable resin composition of the present invention is suitable as a material for forming a resin layer in a display device comprising a display member and an optical member disposed on the front surface of the display member with the resin layer interposed therebetween. By photocuring the photocurable resin composition of the present invention to form a cured product, a resin layer having excellent stress relaxation properties and transparency can be formed. There are no particular limitations on the formation of the resin layer, which can be achieved using a method in which the photocurable resin composition is injected between the display member and the optical member and then photocured, or using a method in which the photocurable resin composition is applied to either one of the display member and the optical member and subsequently photocured, and the other member is then bonded.

The cured product of the photocurable resin composition according to the present invention exhibits pressure-sensitive adhesiveness. Accordingly, in an alternative method for forming the resin layer, a resin sheet formed from a cured product of the photocurable resin composition is first prepared, and the resin sheet can then be used to bond the display member and a cover member. The resin sheet can be obtained by applying the photocurable resin composition in a sheet-like manner to the surface of a release-treated film, and subsequently irradiating the composition with light to cure the applied layer. During the light irradiation, it is preferable that the apparatus is either purged with an inert gas or the surface of the applied layer is covered with a protective film to prevent polymerization inhibition caused by oxygen.

Assuming use of the photocurable resin composition as a resin layer material within a display device, the cured product of the photocurable resin composition preferably exhibits excellent tack durability under commonly-used operating conditions. For example, considering the potential operating environments for a mobile phone, the cured product preferably exhibits excellent tack durability within a temperature range from 0° C. to 70° C. Accordingly, the cured product preferably has appropriate elastic characteristics within the above temperature range. More specifically, the storage elastic modulus and loss elastic modulus values of the cured product preferably simultaneously satisfy the ranges (1) to (3) described below.

(1) At 70° C., the storage elastic modulus is preferably within a range from $1 \times 10^3$ to $1 \times 10^6$ Pa, and more preferably from $1 \times 10^4$ to $1 \times 10^5$ Pa, and the loss elastic modulus is preferably within a range from $1 \times 10^3$ to $1 \times 10^6$ Pa, and more preferably from $1 \times 10^4$ to $1 \times 10^5$ Pa.

(2) At 23° C., the storage elastic modulus is preferably within a range from $1 \times 10^4$ to $5 \times 10^6$ Pa, more preferably from $3 \times 10^4$ to $1 \times 10^6$ Pa, and still more preferably from $5 \times 10^4$ to $1 \times 10^6$ Pa, and the loss elastic modulus is preferably within a range from $1 \times 10^4$ to $5 \times 10^6$ Pa, more preferably from $3 \times 10^4$ to $1 \times 10^6$ Pa, and still more preferably from $5 \times 10^4$ to $1 \times 10^6$ Pa.

(3) At 0° C., the storage elastic modulus is preferably within a range from $5 \times 10^4$ to $1 \times 10^7$ Pa, more preferably from $2 \times 10^5$ to $1 \times 10^7$ Pa, and still more preferably from $5 \times 10^5$ to $1 \times 10^7$ Pa, and the loss elastic modulus is preferably within a range from $5 \times 10^4$ to $1 \times 10^7$ Pa, more preferably from $2 \times 10^5$ to $1 \times 10^7$ Pa, and still more preferably from $5 \times 10^5$ to $1 \times 10^7$ Pa.

If either of the elastic modulus values for the cured product falls below the range at any of the above temperatures, then thermal deformation or the like of the optical member tends to increase the likelihood of lifting or detachment at the peripheral portions of the sheet. This tendency is particularly marked in those cases where a plastic sheet such as an acrylic sheet, which tends to be more prone to thermal deformation than a glass sheet, is used as the optical member. In contrast, if the elastic modulus of the cured product exceeds any of the above ranges, then display irregularities tend to occur more readily even under normal operating conditions. In particular, if either of the elastic modulus values at 0° C. exceeds the range described above, then detachment may occur at the bonding surface during use under low-temperature conditions, meaning a deterioration in reliability is likely. Furthermore, if the elastic modulus at 70° C. falls below the above range, then the sheet may be unable to completely suppress stress due to strain within the optical member, leading to detachment at the bonding surface and/or display irregularities, and meaning a deterioration in the reliability of the display device is likely.

In the present description, the "storage elastic modulus" and the "loss elastic modulus" are indicators of the pressure-sensitive adhesiveness and stress relaxation properties of the cured product of the resin composition, and are measured using the methods described below.

(Method of Measuring Elastic Modulus)

Sheets of various thicknesses are laminated to prepare strip-like sheets having dimension of length: 5 mm, width: 12.0 mm and thickness 1.0 mm, and these strip-like sheets are used as test pieces. Each test piece is measured in film shear mode, under the conditions listed below.

Measuring apparatus: DMS6100, manufactured by SII NanoTechnology Inc.

Frequency: 10 Hz

Temperature: −100° C. to 100° C. (rate of temperature increase: 2° C./min)

In one embodiment of the present invention, a resin sheet member that is obtained by sandwiching the photocurable resin composition between light force-strippable and heavy force-strippable protective films (first and second films) that have been release-treated to exhibit different release force values, and subsequently photocuring the resin composition can be provided as a material for forming the resin layer in a display device. In this type of resin sheet member, because the resin sheet itself exhibits pressure-sensitive adhesiveness, following removal of the light protective film, the resin sheet can be bonded directly to one of the installation surfaces. Then, following removal of the heavy protective film, the other installation surface can be bonded to the resin sheet, yielding a display device with no air layer. Although there are no particular limitations on the thickness of the resin sheet, from the viewpoint of achieving reaction uniformity through the thickness direction of the sheet, the thickness is preferably within a range from approximately 0.02 to 2.0 mm, and more preferably from 0.05 to 1.0 mm.

Assuming use of the resin sheet as a resin layer material within a display device, the resin sheet preferably exhibits appropriate tack strength. More specifically, the resin sheet is preferable in which the peel adhesive strength measured at room temperature (23° C.) is within a range from 0.2 to 40 N/25 mm, more preferably from 0.5 to 30 N/25 mm, and still more preferably from 1 to 20 N/25 mm. Further, in consideration of the heat resistance of the resin sheet, the resin sheet is preferable in which the peel adhesive strength measured at 80° C. is within a range from 0.2 to 30 N/25 mm, more preferably from 0.5 to 20 N/25 mm, and still more preferably from 1 to 10 N/25 mm. If the peel adhesive strength is less than the above range, then securing and holding together the optical member and the display member may tend to become difficult, whereas if the peel adhesive strength exceeds the above range, then the rework properties during production of the display device may tend to deteriorate, resulting in lower yield. Values for the above-mentioned peel adhesive strength represent values measured in accordance with the method prescribed in JIS R 3202.

Plastic films are preferred as the protective films, and at least the surface of each film on which the resin sheet is formed is preferably subjected to a release treatment. Specific examples of the plastic films include polyethylene films, polypropylene films, polyester films, polyvinyl chloride films, cellulose-based films such as triacetyl cellulose, acrylic films, polyethylene, polypropylene, and polyolefin-based films having cyclic or norbornene structures.

Although there are no particular limitations on the thicknesses of the first and second films used as the protective films, films having a thickness of 0.5 to 2.0 mm are generally used. Further, the release treatment of the films can be performed using various conventional methods including addition reaction-type or condensation reaction-type silicone treatments, long-chain alkyl treatments and fluorine treatments. From the viewpoint of the handling properties of the resulting resin sheet member, the first and second films are preferably release-treated so as to exhibit different release force values from each other.

The resin sheet member described above can be produced using a method comprising a step of applying the photocurable resin composition of the present invention in a sheet-like manner to one surface of one of the protective films and subsequently covering the composition with the other protective film, and a step of curing the photocurable resin composition by irradiating light through the principal surface of at least one of the protective films.

In the curing step for the photocurable resin composition of the present invention, the light source lamp used for the light irradiation preferably has an emission distribution at a wavelength of 400 nm or lower. Examples of such light source lamps include a low-pressure mercury lamp, medium-pressure mercury lamp, high-pressure mercury lamp, ultra high-pressure mercury lamp, chemical lamp, black light lamp, metal halide lamp or microwave-excited mercury lamp. Among these, from the viewpoint of controlling the molecular weight of the cured product, the use of a chemical lamp or black light lamp capable of irradiating ultraviolet light having a peak wavelength of 365 nm and comprising substantially no wavelengths less than 280 nm is preferred.

In one embodiment of the present invention, ultraviolet light having a peak wavelength of 365 nm is used, and the curing step is preferably performed by irradiating this ultraviolet light for 2 or more minutes at an intensity of 0.1 to 20.0 mW/cm$^2$. More preferred irradiation conditions for the curing step involve using an ultraviolet light intensity of 0.5 to 1.5 mW/cm$^2$ for an irradiation time of 3 or more minutes. If the ultraviolet light intensity is higher than 20.0 mW/cm$^2$, then the molecular weight of the obtained cured product tends to decrease and the holding force at high temperatures tends to deteriorate. In contrast, if the ultraviolet light intensity is lower than 0.1 mW/cm$^2$, then the time required to ensure complete polymerization during the curing step becomes long, making the process impractical. In the present invention, provided curing is first performed by irradiating ultraviolet light having a peak wavelength of 365 nm for 2 or more minutes at an intensity of 0.01 to 20.0 mW/cm$^2$, subsequent irradiation at an intensity exceeding the above range may be performed.

In one embodiment of the present invention, a display device can be produced that includes a resin layer formed from a cured product of the photocurable resin composition or resin sheet of the present invention described above. The display device according to the present invention may be any device comprising a display member and an optical member that is disposed on the front surface of the display member that functions as the viewed side with the resin layer interposed therebetween, and there are no particular limitations on the members used or the materials used in forming the members. With a display device having this type of structure, the display irregularities observed in conventional display devices in which the display member and the optical member are bonded together directly can be improved, and moreover, even compared with display devices having structures in which an air layer is provided between the display member and the optical member, the resin layer is able to suppress light scattering, enabling an improvement in the visibility of the display. Furthermore, the elastic characteristics of the resin that constitutes the resin layer is able to reduce external impacts, meaning breakage to optical members such as cover members and to the display device module can be suppressed. Even if the cover member were to be broken, the resin layer is able to prevent scattering of fragments of the cover member.

Specific examples of the display device according to the present invention include the display devices within mobile phones, personal computers, televisions, and all manner of other electrical equipment and electronic devices. This type of display device can be produced by applying or injecting the photocurable resin composition of the present invention between a display member and an optical member, and then curing the resin composition to form a resin layer. The resin sheet member described above can also be used as the material for the resin layer.

The photocurable resin composition of the present invention and the cured product thereof have excellent stress relaxation properties, and can be designed with pressure-sensitive adhesiveness within a range from mild tack strength to high tack strength in accordance with the intended purpose. Accordingly, by appropriate preliminary adjustment of the pressure-sensitive adhesiveness of the photocurable resin composition, a resin sheet that exhibits a desired level of pressure-sensitive adhesiveness can be produced with ease. When this type of resin sheet is used, the resin sheet itself functions as the resin layer, and also functions as a pressure-sensitive adhesive. As a result, a display device can be produced with ease by simply bonding the display member to the cover member with the resin sheet interposed therebetween.

With this type of method, because no secondary items such as plasticizers are required during formation of the resin layer, staining of the bonded items such as the display member and the optical member does not occur, and the reliability of the display device upon long-term use can be improved. From the viewpoint of achieving reaction uniformity through the thickness direction, the thickness of the resin layer is preferably within a range from approximately 0.02 to 2.0 mm, and more preferably from 0.05 to 1.0 mm. When the resin layer is formed using a resin sheet, a resin sheet having the desired thickness may be used.

Examples of members that can be used as the display member of the display device include all manner of display panels such as liquid crystal displays, organic EL displays and plasma displays. On the other hand, one example of the optical member is the type of cover member installed on the front surface of the display member. Transparent substrates formed from various conventional materials such as sheets of acrylic resin such as PMMA, polycarbonate resin sheets and glass sheets may be used as the cover member. Various functional layers well known in the technical field, such as touch panel layers, may be provided on the cover member to form the optical member. In those cases where these types of functional layers are provided, a resin sheet according to the present invention is preferably used for bonding the functional layer to the cover member.

The resin layer of a display device according to the present invention exhibits excellent stress relaxation properties and appropriate pressure-sensitive adhesiveness, can be formed with a desired thickness without incorporating any gas bubbles, does not suffer from cloudiness under conditions of high humidity, and exhibits excellent transparency. As a result, the present invention is able to provide a display device for which problems such as display irregularities have been significantly improved, and which exhibits excellent visibility and superior reliability.

EXAMPLES

The present invention is described below in further detail based on a series of examples and comparative examples, but the present invention is in no way limited by the examples presented below. The various polyoxyalkylene polyols and acrylic syrups used in the examples and comparative examples are described below.

Polyoxyalkylene Polyol (a1-1)

A polyoxypropylene diol having a hydroxyl value of 56.0 mgKOH/g, obtained by using potassium hydroxide to add additional propylene oxide (PO) to a propylene glycol (PG) propylene oxide (PO) adduct (hydroxyl value: 112 mgKOH/g).

Polyoxyalkylene Polyol (a1-2)

A polyoxypropylene-ethylene diol having an oxyethylene group content of 12% by mass and a hydroxyl value of 28.0 mgKOH/g, obtained by using potassium hydroxide to add ethylene oxide (EO) to a propylene glycol (PG) propylene oxide (PO) adduct (hydroxyl value: 36 mgKOH/g).

Acrylic Syrup (B1)

A 2-liter round-bottom flask fitted with a condenser, a nitrogen gas inlet tube, a thermometer and a stirrer was charged with 500 g of an acrylic rubber with a weight-average molecular weight (Mw) of $60 \times 10^4$ formed from 92% by weight of 2-ethylhexyl acrylate (2-EHA) and 8% by weight of acrylic acid (AA), 460 g of 2-ethylhexyl acrylate (2-EHA), and 40 g of acrylic acid (AA), and these raw materials were stirred at 50° C. until the acrylic rubber had dissolved completely.

Acrylic Syrup (B2)

A 2-liter round-bottom flask fitted with a condenser, a nitrogen gas inlet tube, a thermometer and a stirrer was charged with 500 g of an acrylic rubber with a weight-average molecular weight (Mw) of $60 \times 10^4$ formed from 97% by weight of 2-ethylhexyl acrylate (2-EHA) and 3% by weight of acrylic acid (AA), 485 g of 2-ethylhexyl acrylate (2-EHA), and 15 g of acrylic acid (AA), and these raw materials were stirred at 50° C. until the acrylic rubber had dissolved completely.

Acrylic Syrup (B3)

A 2-liter round-bottom flask fitted with a condenser, a nitrogen gas inlet tube, a thermometer and a stirrer was charged with 500 g of an acrylic rubber with a weight-average molecular weight (Mw) of $10 \times 10^4$ formed from 80% by weight of 2-ethylhexyl acrylate (2-EHA) and 20% by weight of 2-hydroxyethyl acrylate (2-HEA), 400 g of 2-ethylhexyl acrylate (2-EHA), and 100 g of 2-hydroxyethyl acrylate (2-HEA), and these raw materials were stirred at 50° C. until the acrylic rubber had dissolved completely.

Acrylic Syrup (B4)

A 2-liter round-bottom flask fitted with a condenser, a nitrogen gas inlet tube, a thermometer and a stirrer was charged with 500 g of an acrylic rubber with a weight-average molecular weight (Mw) of $60 \times 10^4$ formed from 70% by weight of 2-ethylhexyl acrylate (2-EHA) and 30% by weight of acrylic acid (AA), 350 g of 2-ethylhexyl acrylate (2-EHA), and 150 g of acrylic acid (AA), and these raw materials were stirred at 50° C. until the acrylic rubber had dissolved completely.

Acrylic Syrup (B5)

A 2-liter round-bottom flask fitted with a condenser, a nitrogen gas inlet tube, a thermometer and a stirrer was charged with 500 g of an acrylic rubber with a weight-average molecular weight (Mw) of $10 \times 10^4$ formed from 92% by weight of 2-ethylhexyl acrylate (2-EHA) and 8% by weight of acrylic acid (AA), 460 g of 2-ethylhexyl acrylate (2-EHA), and 40 g of acrylic acid (AA), and these raw materials were stirred at 50° C. until the acrylic rubber had dissolved completely.

Example of Production of Urethane (Meth)Acrylate Oligomer

An example of the method for producing the urethane (meth)acrylate oligomer used in the present invention is described below.

Production of Monoisocyanate (HEA-H$_6$XDI):

A four-neck flask fitted with a stirrer, a dropping funnel, a nitrogen inlet tube and a thermometer was charged with 194 g of hydrogenated xylylene diisocyanate (b2), 116 g of hydroxyethyl acrylate and 0.005 g of dibutyltin dilaurate, and the resulting reaction mixture was reacted for 3 hours with the temperature held at 80° C. or less. Subsequently, the reaction mixture was left to cool, and when the temperature reached 40° C., an additional 0.005 g of dibutyltin dilaurate was added, and the reaction was halted once it was confirmed that no increase in temperature had occurred. Calculation of the isocyanate concentration within the thus obtained monoisocyanate using a potentiometric automatic titrator (product name: AT-400, manufactured by Kyoto Electronics Manufacturing Co., Ltd.) revealed a concentration of 13.6%.

Urethane Acrylate Oligomer (A1):

A four-neck flask fitted with a stirrer, a dropping funnel, a nitrogen inlet tube and a thermometer was charged with 1,000 g of the polyoxyalkylene polyol (a1-1), 78 g of isophorone diisocyanate (IPDI), 700 g of 2-ethylhexyl acrylate as a diluent, and 0.1 g of dibutyltin dilaurate as a catalyst, and these components were reacted for 4 hours at a temperature of 100° C. The infrared absorption spectrum of the reaction mixture was measured, and once it had been confirmed that the isocyanate group absorption peak (2250 cm$^{-1}$) had disappeared, 69 g of the monoisocyanate (HEA-H$_6$XDI) was added to the reaction mixture, and reaction was continued for a further 2 hours at a temperature of 100° C. The infrared absorption spectrum of the resulting reaction mixture was then measured again, confirming that the isocyanate group absorption (2250 cm$^{-1}$) had disappeared.

Urethane Acrylate Oligomer (A2):

A four-neck flask fitted with a stirrer, a dropping funnel, a nitrogen inlet tube and a thermometer was charged with 1,000 g of the previously prepared polyoxyalkylene polyol (a1-1), 100 g of isophorone diisocyanate (IPDI), 700 g of 2-ethylhexyl acrylate as a diluent, and 0.1 g of dibutyltin dilaurate as a catalyst, and these components were reacted for 4 hours at a temperature of 100° C. The infrared absorption spectrum of the reaction mixture was measured, and once it had been confirmed that the isocyanate group absorption (2250 cm$^{-1}$) had disappeared, 23 g of the monoisocyanate (HEA-H$_6$XDI) was added to the reaction mixture, and reaction was continued for a further 2 hours at a temperature of 100° C. Subsequently, the infrared absorption spectrum of the resulting reaction mixture was measured again, confirming that the isocyanate group absorption (2250 cm$^{-1}$) had disappeared.

Urethane Acrylate Oligomer (A3):

A four-neck flask fitted with a stirrer, a dropping funnel, a nitrogen inlet tube and a thermometer was charged with 1,000 g of the polyoxyalkylene polyol (a1-1), 106 g of isophorone diisocyanate (IPDI), 700 g of 2-ethylhexyl acrylate as a diluent, and 0.1 g of dibutyltin dilaurate as a catalyst, and these components were reacted for 4 hours at a temperature of 100° C. The infrared absorption spectrum of the reaction mixture was measured, and once it had been confirmed that the isocyanate group absorption peak (2250 cm$^-$) had disappeared, 10.6 g of the monoisocyanate (HEA-H$_6$XDI) was added to the reaction mixture, and reaction was continued for a further 2 hours at a temperature of 100° C. The infrared absorption spectrum of the thus obtained reaction mixture was then measured again, confirming that the isocyanate group absorption (2250 cm$^{-1}$) had disappeared.

Urethane Acrylate Oligomer (A4):

A four-neck flask fitted with a stirrer, a dropping funnel, a nitrogen inlet tube and a thermometer was charged with 1,000 g of the polyoxyalkylene polyol (a1-1), 166 g of isophorone diisocyanate (IPDI), 700 g of 2-ethylhexyl acrylate as a diluent, and 0.1 g of dibutyltin dilaurate as a catalyst, and these components were reacted for 4 hours at a temperature of 100° C. Subsequently, 57 g of hydroxyethyl acrylate (HEA) was added to the reaction mixture, and reaction was continued for a further 2 hours at a temperature of 100° C. The infrared absorption spectrum of the thus obtained reaction mixture was then measured, confirming that the isocyanate group absorption (2250 cm$^{-1}$) had disappeared.

Urethane Acrylate Oligomer (A5):

A four-neck flask fitted with a stirrer, a dropping funnel, a nitrogen inlet tube and a thermometer was charged with 1,000 g of the polyoxyalkylene polyol (a1-1), 100 g of isophorone diisocyanate (IPDI), 700 g of 2-ethylhexyl acrylate as a diluent, and 0.1 g of dibutyltin dilaurate as a catalyst, and these components were reacted for 4 hours at a temperature of 100° C. The infrared absorption spectrum of the reaction mixture was measured, and once it had been confirmed that the isocyanate group absorption peak (2250 cm$^{-1}$) had disappeared, 31 g of the monoisocyanate (HEA-H$_6$XDI) was added to the reaction mixture, and reaction was continued for a further 2 hours at a temperature of 100° C. The infrared absorption spectrum of the thus obtained reaction mixture was then measured again, confirming that the isocyanate group absorption (2250 cm$^{-1}$) had disappeared.

Urethane Acrylate Oligomer (A6):

A four-neck flask fitted with a stirrer, a dropping funnel, a nitrogen inlet tube and a thermometer was charged with 1,000 g of the polyoxyalkylene polyol (a1-1), 56 g of isophorone diisocyanate (IPDI), 700 g of 2-ethylhexyl acrylate as a diluent, and 0.1 g of dibutyltin dilaurate as a catalyst, and these components were reacted for 4 hours at a temperature of 100° C. The infrared absorption spectrum of the reaction mixture was measured, and once it had been confirmed that the isocyanate group absorption peak (2250 cm$^{-1}$) had disappeared, 115 g of the monoisocyanate (HEA-H$_6$XDI) was added to the reaction mixture, and reaction was continued for a further 2 hours at a temperature of 100° C. The infrared absorption spectrum of the thus obtained reaction mixture was then measured again, confirming that the isocyanate group absorption (2250 cm$^{-1}$) had disappeared.

Urethane Acrylate Oligomer (A7):

A four-neck flask fitted with a stirrer, a dropping funnel, a nitrogen inlet tube and a thermometer was charged with 1,000 g of the polyoxyalkylene polyol (a1-1), 222 g of isophorone diisocyanate (IPDI), 700 g of 2-ethylhexyl acrylate as a diluent, and 0.1 g of dibutyltin dilaurate as a catalyst, and these components were reacted for 4 hours at a temperature of 100° C. The isocyanate concentration within the reaction mixture was measured using an AT-400 potentiometric automatic titrator (manufactured by Kyoto Electronics Manufacturing Co., Ltd.), and once it had been confirmed that the isocyanate concentration had reached 0.75%, 840 g of a polyoxyalkylene monool (a commercial product Preminol S 1004, manufactured by Asahi Glass Co., Ltd., hydroxyl value: 16.7 mgKOH/g) and 87 g of hydroxyethyl acrylate (HEA) were added to the reaction mixture, and reaction was continued for a further 2 hours at a temperature of 100° C. The infrared absorption spectrum of the thus obtained reaction mixture was then measured, confirming that the isocyanate group absorption (2250 cm$^{-1}$) had disappeared.

Urethane Acrylate Oligomer (A8):

A four-neck flask fitted with a stirrer, a dropping funnel, a nitrogen inlet tube and a thermometer was charged with 1,000 g of the polyoxyalkylene polyol (a1-1), 100 g of isophorone diisocyanate (IPDI), 700 g of 2-ethylhexyl acrylate as a diluent, and 0.1 g of dibutyltin dilaurate as a catalyst, and these components were reacted for 4 hours at a temperature of 100° C. The infrared absorption spectrum of the reaction mixture was measured, and once it had been confirmed that the isocyanate group absorption peak (2250 cm$^{-1}$) had disappeared, 7.8 g of the monoisocyanate (HEA-H$_6$XDI) was added to the reaction mixture, and reaction was continued for a further 2 hours at a temperature of 100° C. The infrared absorption spectrum of the thus obtained reaction mixture was then measured again, confirming that the isocyanate group absorption (2250 cm$^{-1}$) had disappeared.

Urethane Acrylate Oligomer (A9):

A four-neck flask fitted with a stirrer, a dropping funnel, a nitrogen inlet tube and a thermometer was charged with 1,000 g of the polyoxyalkylene polyol (a1-1), 100 g of isophorone diisocyanate (IPDI), 700 g of 2-ethylhexyl acrylate as a diluent, and 0.1 g of dibutyltin dilaurate as a catalyst, and these components were reacted for 4 hours at a temperature of 100° C. The infrared absorption spectrum of the reaction mixture was measured, and once it had been confirmed that the isocyanate group absorption peak (2250 cm$^{-1}$) had disappeared, 31 g of the monoisocyanate (HEA-H$_6$XDI) was added to the reaction mixture, and reaction was continued for a further 2 hours at a temperature of 100° C. The infrared absorption spectrum of the thus obtained reaction mixture was then measured again, confirming that the isocyanate group absorption (2250 cm$^{-1}$) had disappeared.

Urethane Acrylate Oligomer (A10):

A four-neck flask fitted with a stirrer, a dropping funnel, a nitrogen inlet tube and a thermometer was charged with 1,000 g of the polyoxyalkylene polyol (a1-2), 54 g of isophorone diisocyanate (IPDI), 700 g of 2-ethylhexyl acrylate as a diluent, and 0.1 g of dibutyltin dilaurate as a catalyst, and these components were reacted for 4 hours at a temperature of 100° C. The infrared absorption spectrum of the reaction mixture was measured, and once it had been confirmed that the isocyanate group absorption peak (2250 cm$^{-1}$) had disappeared, 6.5 g of the monoisocyanate (HEA-H$_6$XDI) was added to the reaction mixture, and reaction was continued for a further 2 hours at a temperature of 100° C. The infrared absorption spectrum of the thus obtained reaction mixture was then measured again, confirming that the isocyanate group absorption (2250 cm$^{-1}$) had disappeared.

Example 1

1. Preparation of Sheet Member

A four-neck flask fitted with a stirrer, a vacuum tube and a thermometer was charged with 200 g of the previously prepared oligomer A1 as the urethane acrylate oligomer and 800 g of the previously prepared syrup B1 as the acrylic syrup, and following stirring for 1 hour at 30° C., defoaming was performed by stirring the mixture for 15 minutes under a pressure of 100 mmHg. Subsequently, 10 g of 1-hydroxycyclohexyl phenyl ketone was added to the reaction mixture as a photopolymerization initiator, and after stirring for 1 hour at 30° C., defoaming was performed by stirring for 15 minutes under a pressure of 100 mmHg. The thus obtained varnish was sandwiched between two PET separator films, which had been subjected to preliminary silicone treatments so that the two films exhibited different peel strength values, so as to form a varnish layer thickness of 175 μm. Ultraviolet light with an intensity of 0.5 mW/cm$^2$ was then irradiated through both PET separator films for 7 minutes using a black light, thereby curing the varnish layer and forming a sheet member.

2. Evaluation of Sheet Member

Using the sheet member prepared above, the various tests described below were performed. The evaluation results of each test are shown in Table 1.

(Peel Adhesive Strength)

The sheet member was cut to dimensions of 25×100 mm, the light separator film was removed, and the exposed sheet surface was bonded to an easy-bond PET support having a thickness of 38 μm. Subsequently, the heavy separator film of the sheet member was removed, and the exposed sheet surface was bonded to a float glass (prescribed in JIS R 3202) of width 30 mm×length 100 mm×thickness 2.0 mm, thus forming a test piece. Two test pieces were left to stand for 2 hours under temperature conditions of 23° C. and 80° C. respectively, and each test piece was then placed in a pull tester, the sheet was peeled from the glass interface at room temperature (23° C.) at a peel angle of 180° and a peel speed of 200 mm/minute, and the stress during peeling was measured. Considering application of the sheet as a resin layer material within a display device, the various measured values shown in Table 1 were evaluated in the following manner.

A: the stress during peeling was at least 4 N/25 mm

B: the stress during peeling was at least 2 N/25 mm, but less than 4 N/25 mm

C: the stress during peeling was at least 0.5 N/25 mm, but less than 2 N/25 mm

D: the stress during peeling was less than 0.5 N/25 mm (Anti-bleeding Properties)

A test piece similar to those prepared for the peel adhesive strength test was prepared, having a PET support on one surface and a float glass on the other surface, and this test piece was left to stand for 24 hours under temperature conditions of 80° C. Subsequently, the test piece was separated at the interface between the sheet layer and the glass, and the surface of the glass was inspected visually and evaluated for the presence of bleed components. The evaluation criteria for the results shown in Table 1 were as follows.

P: no bleed components were observed on the glass surface.

P$^-$: almost no bleed components were observed on the glass surface.

F: bleed components were observed on the glass surface.

(80° C. Reliability)

The previously prepared sheet member was cut to dimensions of 40×60 mm, the light separator film was removed, and the exposed sheet surface was bonded to a cover member composed of a float glass of 80 mm×60 mm×thickness 1.0 mm (prescribed in JIS R 3202) having a polarizing plate bonded thereto, with the sheet surface contacting the polarizing plate. The structure was subjected to a defoaming treatment in an autoclave for 30 minutes at 50° C. and 0.5 MPa, and then left to stand in an atmosphere at 80° C. Further, using a similar procedure, a test piece was also prepared using an acrylic sheet of dimensions 85 mm×45 mm×thickness 2 mm (product name: Acrylite MR-200, manufactured by Mitsubishi Rayon Co., Ltd.) as the cover member, and the test piece was subjected to the same treatments as those described above. Two of each of the test pieces were prepared with either the float glass or the acrylic sheet as the cover member, and after standing for 6 hours at 80° C., the polarizing plate interface was inspected visually. Namely, two evaluations were performed for each type of test piece, and the reliability was then evaluated against the following criteria. The results are shown in Table 1.

(Evaluation Criteria)

A: in both test pieces, no peeling, lifting or foaming was observed between the sheet and the polarizing plate.

B: in one of the two test pieces, slight peeling, lifting or foaming was observed between the sheet and the polarizing plate.

C: in both of the two test pieces, slight peeling, lifting or foaming was observed between the sheet and the polarizing plate.

D: in both of the two test pieces, significant peeling, lifting or foaming was observed between the sheet and the polarizing plate.

(Transparency)

The previously prepared sheet member was cut to dimensions of 20×40 mm, and following removal of the light separator film, the exposed sheet surface was bonded to a micro slide glass S3233 (thickness: 1.3 mm, dimensions: 48×28 mm) manufactured by Matsunami Glass Ind., Ltd., with care taken to ensure no gas bubbles were incorporated between the surfaces, thus forming a test piece. The haze of this test piece was measured using a haze meter prescribed in JIS K 7105, and then evaluated against the following criteria.

P: the haze was 0.3% or less

F: the haze was 0.4% or greater (−10° C. Drop Impact Test)

The previously prepared sheet member was cut to dimensions of 40×40 mm, one of the separator films was removed to expose the sheet surface, and the sheet surface was bonded to a first acrylic sheet. Subsequently, the remaining separator film on the sheet member was removed to expose the sheet surface, a second acrylic sheet was positioned so as to form a joint in a longitudinal direction with the first acrylic sheet, and the second acrylic sheet was then bonded so that the overlap between the two acrylic sheets was 60 mm, thus completing preparation of a test piece. In the preparation of this test piece, sheets of the product Acrylite MR-200 (manufactured by Mitsubishi Rayon Co., Ltd.) with dimensions of 85 mm×45 mm×thickness 2 mm were used as the first and second acrylic sheets.

The test piece was secured with the longitudinal direction of the test piece positioned vertically, a steel ball of weight 110 g was dropped from a height of 1 m onto the edge of the test piece (namely, the bonded surface), and following impact, the test piece was inspected for the presence of peeling or detachment. The evaluation criteria for the results shown in Table 1 were as follows.
 P: no peeling or detachment
 F: peeling or detachment 3. Preparation and Evaluation of Display Device Two sheets of float glass of dimensions 80 mm×60 mm×thickness 0.55 mm (prescribed in JIS R 3202) were bonded together with a transparent pressure-sensitive adhesive tape YY621-3 (thickness: 0.1 mm) manufactured by Hitachi Kasei Polymer Co., Ltd., ensuring no incorporation of gas bubbles, and the resulting laminate was used as an alkali-free glass sheet. A polarizing plate was bonded to each surface of the glass sheet using a laminator roller, with the two polarizing plates adopting a cross-Nicol relationship, and the resulting structure was placed and held for 20 minutes in an autoclave at 50° C. and 5 atmospheres. The polarizing plate/alkali-free glass sheet/polarizing plate structure obtained in this manner was used to resemble a liquid crystal panel.

Subsequently, the previously prepared sheet member was cut to dimensions of 40×60 mm, the light separator film of the sheet member was removed, and the exposed sheet surface was bonded to a cover member composed of a float glass of 80 mm×60 mm×thickness 1.0 mm (prescribed in JIS R 3202). Next, the heavy separator film of the sheet member was removed, the exposed sheet surface was bonded to one surface of the above structure prepared as a liquid crystal panel, and the resulting structure was placed and held for 20 minutes in an autoclave at 50° C. and 5 atmospheres, thus completing preparation of a test piece. Using a similar procedure, a separate test piece was prepared using an acrylic sheet of dimensions 85 mm×45 mm×thickness 2 mm (product name: Acrylite MR-200) as the cover member. By disposing each of the thus obtained test pieces on a backlight of 1000 candelas, test samples for evaluating display irregularities having a structure comprising cover member/sheet member/liquid crystal panel structure described above/polarizing plate/backlight were prepared. Light was irradiated from the backlight, the test sample was inspected visually for display light leakage, and the display irregularities were evaluated against the criteria shown below.
 A: absolutely no light leakage was observed
 B: almost no light leakage was observed
 C: slight light leakage was observed
 D: significant light leakage was observed Example 2

With the exception of using the previously prepared oligomer A2 as the urethane acrylate oligomer, exactly the same formulations and methods as Example 1 were used to prepare a varnish, and then prepare and evaluate a sheet member. A display device was also prepared and evaluated in the same manner as Example 1. The results are shown in Table 1.

Example 3

With the exception of using the previously prepared oligomer A3 as the urethane acrylate oligomer, exactly the same formulations and methods as Example 1 were used to prepare a varnish, and then prepare and evaluate a sheet member. A display device was also prepared and evaluated in the same manner as Example 1. The results are shown in Table 1.

Example 4

With the exception of using the previously prepared oligomer A5 as the urethane acrylate oligomer, exactly the same formulations and methods as Example 1 were used to prepare a varnish, and then prepare and evaluate a sheet member. A display device was also prepared and evaluated in the same manner as Example 1. The results are shown in Table 1.

Example 5

With the exception of using the previously prepared oligomer A9 as the urethane acrylate oligomer, exactly the same formulations and methods as Example 1 were used to prepare a varnish, and then prepare and evaluate a sheet member. A display device was also prepared and evaluated in the same manner as Example 1. The results are shown in Table 1.

Example 6

With the exception of using the previously prepared syrup B2 as the acrylic syrup, exactly the same formulations and methods as Example 2 were used to prepare a varnish, and then prepare and evaluate a sheet member. A display device was also prepared and evaluated in the same manner as Example 1. The results are shown in Table 1.

Example 7

With the exception of using the previously prepared syrup B3 as the acrylic syrup, exactly the same formulations and methods as Example 2 were used to prepare a varnish, and then prepare and evaluate a sheet member. A display device was also prepared and evaluated in the same manner as Example 1. The results are shown in Table 1.

Example 8

With the exception of using the previously prepared syrup B5 as the acrylic syrup, exactly the same formulations and methods as Example 2 were used to prepare a varnish, and then prepare and evaluate a sheet member. A display device was also prepared and evaluated in the same manner as Example 1. The results are shown in Table 2.

Example 9

With the exceptions of using the previously prepared oligomer A2 as the urethane acrylate oligomer, and using the previously prepared syrup B1 as the acrylic syrup, exactly the same procedure as Example 1 was used to prepare a reaction mixture that was the same as the varnish of Example 1. Subsequently, 5 g of 3-glycidoxypropylmethyldiethoxysilane was added to the reaction mixture, and following stirring for 15 minutes at 30° C., defoaming was performed by stirring the mixture for 15 minutes under a pressure of 100 mmHg. Using the same methods as Example 1, the thus obtained varnish was cured to form a sheet member, and then evaluated. A display device was also prepared and evaluated in the same manner as Example 1. The results are shown in Table 2.

Example 10

A four-neck flask fitted with a stirrer, a vacuum tube and a thermometer was charged with 200 g of the previously prepared oligomer A2 as the urethane acrylate oligomer, 800 g of the previously prepared syrup B3 as the acrylic syrup and 50 g of FTR6100 (a product name) manufactured by Mitsui Chemicals, Inc. as a tackifier, and following stirring for 2 hours at 50° C., defoaming was performed by stirring the mixture for 15 minutes under a pressure of 100 mmHg. Following cooling of the reaction mixture to a temperature of 30° C., 10 g of 1-hydroxycyclohexyl phenyl ketone was added to the reaction mixture as a photopolymerization initiator, and after stirring for 1 hour at 30° C., defoaming was performed by stirring for 15 minutes under a pressure of 100 mmHg. In a similar manner to Example 1, the thus obtained varnish was sandwiched between two PET separator films, which had been subjected to preliminary surface silicone treatments so that the two films exhibited different peel strength values, so as to form a varnish layer thickness of 175 μm. Ultraviolet light with an intensity of 0.5 mW/cm² was then irradiated through the principal surfaces of both PET separator films for 7 minutes using a black light, thereby curing the varnish layer and forming a sheet member. The prepared sheet member was subjected to the same tests as those described for Example 1, and a display device was also prepared and evaluated in the same manner as Example 1. The results are shown in Table 2.

Example 11

With the exception of using the previously prepared oligomer A10 as the urethane acrylate oligomer, exactly the same formulations and methods as Example 2 were used to prepare a varnish, and then prepare and evaluate a sheet member. A display device was also prepared and evaluated in the same manner as Example 1. The results are shown in Table 2.

Example 12

With the exception of using the previously prepared oligomer A8 as the urethane acrylate oligomer, exactly the same formulations and methods as Example 1 were used to prepare a varnish, and then prepare and evaluate a sheet member. A display device was also prepared and evaluated in the same manner as Example 1. The results are shown in Table 2.

Example 13

With the exception of using the previously prepared syrup B4 as the acrylic syrup, exactly the same formulations and methods as Example 2 were used to prepare a varnish, and then prepare and evaluate a sheet member. A display device was also prepared and evaluated in the same manner as Example 1. The results are shown in Table 2.

Example 14

A four-neck flask fitted with a stirrer, a vacuum tube and a thermometer was charged with 300 g of the previously prepared oligomer A9 as the urethane acrylate oligomer and 700 g of the previously prepared syrup B1 as the acrylic syrup, and following stirring for 1 hour at 30° C., defoaming was performed by stirring the mixture for 15 minutes under a pressure of 100 mmHg. Subsequently, 10 g of 1-hydroxycyclohexyl phenyl ketone was added to the reaction mixture as a photopolymerization initiator, and after stirring for 1 hour at 30° C., defoaming was performed by stirring for 15 minutes under a pressure of 100 mmHg. The thus obtained varnish was sandwiched between two PET separator films, which had been subjected to preliminary surface silicone treatments so that the two films exhibited different peel strength values, so as to form a varnish layer thickness of 175 μm. Ultraviolet light with an intensity of 400 mW/cm² was then irradiated through both PET separator films using a metal halide lamp so as to provide a total light dose of 3,000 mJ/cm², thereby curing the varnish layer and forming a sheet member. A display device was also prepared and evaluated in the same manner as Example 1. The results are shown in Table 2.

Comparative Example 1

With the exception of using the previously prepared oligomer A6 as the urethane acrylate oligomer, exactly the same formulations and methods as Example 1 were used to prepare a varnish, and then prepare and evaluate a sheet member. A display device was also prepared and evaluated in the same manner as Example 1. The results are shown in Table 3.

Comparative Example 2

With the exception of using the previously prepared oligomer A4 as the urethane acrylate oligomer, exactly the same formulations and methods as Example 1 were used to prepare a varnish, and then prepare and evaluate a sheet member. A display device was also prepared and evaluated in the same manner as Example 1. The results are shown in Table 3.

Comparative Example 3

With the exception of using the previously prepared oligomer A7 as the urethane acrylate oligomer, exactly the same formulations and methods as Example 1 were used to prepare a varnish, and then prepare and evaluate a sheet member. A display device was also prepared and evaluated in the same manner as Example 1. The results are shown in Table 3.

Comparative Example 4

With the exception of using the previously prepared syrup B3 as the acrylic syrup, exactly the same formulations and methods as Comparative Example 3 were used to prepare a varnish, and then prepare and evaluate a sheet member. A display device was also prepared and evaluated in the same manner as Example 1. The results are shown in Table 1.

TABLE 1

Results of Examples 1 to 7

| | Example 1 | Example 2 | Example 3 | Example 4 | Example 5 | Example 6 | Example 7 |
|---|---|---|---|---|---|---|---|
| N(=n1/n2) | 5153 | 15136 | 32655 | 11310 | 11310 | 15136 | 15136 |
| (Meth)acrylic Acid (c1) mol % within (C) | 18% | 18% | 18% | 18% | 18% | 7% | 0% |
| Molecular Weight of (B) | $60 \times 10^4$ | $60 \times 10^4$ | $60 \times 10^4$ | $60 \times 10^4$ | $60 \times 10^4$ | $60 \times 10^4$ | $10 \times 10^4$ |
| Storage Elastic Modulus [Pa] at 70° C. | $7.6 \times 10^4$ | $7.7 \times 10^4$ | $7.7 \times 10^4$ | $7.7 \times 10^4$ | $4.7 \times 10^4$ | $7.7 \times 10^4$ | $1.5 \times 10^4$ |
| Loss Elastic Modulus [Pa] at 70° C. | $4.3 \times 10^4$ | $4.4 \times 10^4$ | $4.4 \times 10^4$ | $4.4 \times 10^4$ | $2.3 \times 10^4$ | $4.4 \times 10^4$ | $3.1 \times 10^4$ |
| Storage Elastic Modulus [Pa] at 23° C. | $2.7 \times 10^5$ | $2.9 \times 10^5$ | $3.0 \times 10^5$ | $2.9 \times 10^5$ | $9.2 \times 10^5$ | $2.9 \times 10^5$ | $1.8 \times 10^5$ |
| Loss Elastic Modulus [Pa] at 23° C. | $2.1 \times 10^5$ | $2.3 \times 10^5$ | $2.4 \times 10^5$ | $2.3 \times 10^5$ | $5.5 \times 10^5$ | $2.3 \times 10^5$ | $1.6 \times 10^5$ |
| Storage Elastic Modulus [Pa] at 0° C. | $1.3 \times 10^6$ | $1.3 \times 10^6$ | $1.6 \times 10^6$ | $1.3 \times 10^6$ | $6.1 \times 10^6$ | $1.1 \times 10^6$ | $1.0 \times 10^6$ |
| Loss Elastic Modulus [Pa] at 0° C. | $1.5 \times 10^6$ | $1.5 \times 10^6$ | $1.8 \times 10^6$ | $1.5 \times 10^6$ | $5.7 \times 10^6$ | $1.3 \times 10^6$ | $1.4 \times 10^6$ |

TABLE 1-continued

Results of Examples 1 to 7

|  | Example 1 | Example 2 | Example 3 | Example 4 | Example 5 | Example 6 | Example 7 |
|---|---|---|---|---|---|---|---|
| −10° C. Drop Impact Test | P | P | P | P | P | P | P |
| Peel Adhesive Strength (23° C.), (N/25 mm) | A (6) | A (10) | A (15) | A (12) | A (5) | A (10) | A (8) |
| Peel Adhesive Strength (80° C.), (N/25 mm) | B (3) | A (4) | A (5) | A (5) | B (2) | B (3) | C (1) |
| Transparency | P | P | P | P | P | P | P |
| Anti-bleeding Properties | P | P | P | P | P | P | P |
| 80° C. Reliability (acrylic/glass) | A/A | A/A | A/A | A/A | B/A | A/A | C/A |
| Display Irregularities | B | B | B | B | B | B | B |

TABLE 2

Results of Examples 8 to 14

|  | Example 8 | Example 9 | Example 10 | Example 11 | Example 12 | Example 13 | Example 14 |
|---|---|---|---|---|---|---|---|
| $N(=n1/n2)$ | 15136 | 15136 | 15136 | 50577 | 44028 | 15136 | 11310 |
| (Meth)acrylic Acid (c1) mol % within (C) | 18% | 18% | 0% | 18% | 18% | 52% | 18% |
| Molecular Weight of (B) | $10 \times 10^4$ | $60 \times 10^4$ | $10 \times 10^4$ | $60 \times 10^4$ | $60 \times 10^4$ | $60 \times 10^4$ | $60 \times 10^4$ |
| Storage Elastic Modulus [Pa] at 70° C. | $7.7 \times 10^4$ | $7.6 \times 10^4$ | $1.6 \times 10^4$ | $7.8 \times 10^4$ | $7.8 \times 10^4$ | $8.2 \times 10^4$ | $3.9 \times 10^4$ |
| Loss Elastic Modulus [Pa] at 70° C. | $4.4 \times 10^4$ | $4.3 \times 10^4$ | $3.2 \times 10^4$ | $4.5 \times 10^4$ | $4.5 \times 10^4$ | $4.9 \times 10^4$ | $5.2 \times 10^4$ |
| Storage Elastic Modulus [Pa] at 23° C. | $2.9 \times 10^5$ | $2.8 \times 10^5$ | $1.8 \times 10^5$ | $3.0 \times 10^5$ | $3.0 \times 10^5$ | $3.5 \times 10^5$ | $2.9 \times 10^5$ |
| Loss Elastic Modulus [Pa] at 23° C. | $2.3 \times 10^5$ | $2.2 \times 10^5$ | $1.6 \times 10^5$ | $2.3 \times 10^5$ | $2.3 \times 10^5$ | $2.7 \times 10^5$ | $9.3 \times 10^5$ |
| Storage Elastic Modulus [Pa] at 0° C. | $1.3 \times 10^6$ | $1.3 \times 10^6$ | $1.1 \times 10^6$ | $1.4 \times 10^6$ | $1.4 \times 10^6$ | $1.7 \times 10^6$ | $6.3 \times 10^6$ |
| Loss Elastic Modulus [Pa] at 0° C. | $1.5 \times 10^6$ | $1.5 \times 10^6$ | $1.3 \times 10^6$ | $1.5 \times 10^6$ | $1.5 \times 10^6$ | $2.0 \times 10^6$ | $5.9 \times 10^6$ |
| −10° C. Drop Impact Test | P | P | P | P | P | P | P |
| Peel Adhesive Strength (23° C.), (N/25 mm) | A (8) | A (12) | A (14) | A (14) | A (18) | A (20) | A (10) |
| Peel Adhesive Strength (80° C.), (N/25 mm) | B (2) | A (4) | C (1) | A (4) | A (6) | A (10) | B (3) |
| Transparency | P | P | P | P | P | P | P |
| Anti-bleeding Properties | P | P | P | P | P | P | P |
| 80° C. Reliability (acrylic/glass) | B/A | A/A | C/A | A/A | B/A | A/A | B/B |
| Display Irregularities | B | B | B | B | B | C | C |

TABLE 3

Results of Comparative Examples 1 to 4

|  | Comparative Example 1 | Comparative Example 2 | Comparative Example 3 | Comparative Example 4 |
|---|---|---|---|---|
| $N(=n1/n2)$ | 3157 | 2489 | 2332 | 2332 |
| (Meth)acrylic Acid (c1) mol % within (C) | 18% | 18% | 18% | 0% |
| Molecular Weight of (B) | $60 \times 10^4$ | $60 \times 10^4$ | $60 \times 10^4$ | $10 \times 10^4$ |
| Storage Elastic Modulus [Pa] at 70° C. | $7.8 \times 10^4$ | $7.6 \times 10^4$ | $7.7 \times 10^4$ | $7.9 \times 10^4$ |
| Loss Elastic Modulus [Pa] at 70° C. | $4.5 \times 10^4$ | $4.4 \times 10^4$ | $4.4 \times 10^4$ | $4.0 \times 10^4$ |
| Storage Elastic Modulus [Pa] at 23° C. | $3.0 \times 10^5$ | $2.9 \times 10^5$ | $3.1 \times 10^5$ | $3.4 \times 10^5$ |
| Loss Elastic Modulus [Pa] at 23° C. | $2.3 \times 10^5$ | $2.2 \times 10^5$ | $2.3 \times 10^5$ | $2.0 \times 10^5$ |
| Storage Elastic Modulus [Pa] at 0° C. | $1.4 \times 10^6$ | $1.4 \times 10^6$ | $1.3 \times 10^6$ | $5.0 \times 10^6$ |
| Loss Elastic Modulus [Pa] at 0° C. | $1.5 \times 10^6$ | $1.5 \times 10^6$ | $1.5 \times 10^6$ | $1.5 \times 10^6$ |
| −10° C. Drop Impact Test | P | P | P | P |
| Peel Adhesive Strength (23° C.), (N/25 mm) | A (4) | A (4) | A (4) | A (7) |
| Peel Adhesive Strength (80° C.), (N/25 mm) | C (1) | C (1.5) | C (1) | D (0.2) |
| Transparency | P | P | P | P |
| Anti-bleeding Properties | P | P | P | P |
| 80° C. Reliability (acrylic/glass) | C/A | C/A | C/C | D/D |
| Display Irregularities | C | C | C | D |

As is evident from the results shown in Tables 1 to 3, in all of the examples, favorable visibility was achieved, with no display irregularities. Further, in terms of other practical properties, favorable results were achieved for at least one of the acrylic sheet or glass sheet used as the cover member. In those cases where an acrylic syrup comprising a carboxyl group-containing monomer and/or polymer was used, favorable results were obtained regardless of the material used for the cover member. In contrast, in the comparative examples, display irregularities were observed, leading to inferior visibility, and inferior results were also obtained for other practical properties.

From the above description it should be self-evident that various different embodiments can be made across a broad range without departing from the spirit or scope of the present invention. Accordingly, the present invention is limited only by the appended claims, and is in no way constrained by the specific embodiments outlined above.

The invention claimed is:

1. A photocurable resin composition for forming a resin layer within a display device comprising a display member and an optical member disposed on a front surface of the display member with the resin layer interposed therebetween, the photocurable resin composition comprising:
- (A) a urethane (meth)acrylate oligomer having a polyoxyalkylene structure,
- (B) a (meth)acrylic polymer,
- (C) a (meth)acrylic monomer, and
- (D) a photopolymerization initiator, wherein the component (A) is produced using three or more monomer components including (a1) at least one polyoxyalkylene polyol, (a2) at least one polyisocyanate, and (a3) at least one hydroxyl group-containing mono(meth)acrylate compound, a relationship N between a total mass n1 of the three or more monomer components and a total equivalent weight n2 of acryloyl groups within the three or more monomer components satisfies a formula shown below, and $$4000 \leq N (=n1/n2) \qquad \text{Formula (I)}$$

the component (A) is substantially free of unreacted isocyanate groups, and wherein the component (B) comprises a (meth)acrylic polymer having a carboxyl group, and the component (C) comprises a (meth)acrylic monomer having a carboxyl group.

2. The photocurable resin composition according to claim 1, wherein the component (A) is a mixture of a urethane (meth)acrylate oligomer having one (meth)acryloyl group, and a urethane (meth)acrylate oligomer having two or more (meth)acryloyl groups.

3. The photocurable resin composition according to claim 2, wherein the component (B) is a copolymer obtained by polymerization of a monomer mixture comprising (b1) (meth)acrylic acid and (b2) a (meth)acrylate ester.

4. The photocurable resin composition according to claim 3, wherein the monomer mixture comprises from 5 to 45 mol % of the (meth)acrylic acid (b1).

5. The photocurable resin composition according to claim 1, wherein the component (B) is a (meth)acrylic polymer having a weight-average molecular weight within a range from $10 \times 10^4$ to $200 \times 10^4$.

6. The photocurable resin composition according to claim 1, wherein the component (C) is a monomer mixture comprising (c1)(meth)acrylic acid and (c2) a (meth)acrylate ester.

7. The photocurable resin composition according to claim 6, wherein the monomer mixture comprises from 5 to 45 mol% of the (meth)acrylic acid (c1).

8. The photocurable resin composition according to claim 1, wherein a monomer mixture that is used for forming the component (B), and the component (C) comprise the same type of compounds.

9. The photocurable resin composition according to claim 1, comprising the components (A), (B) and (C) in a ratio of 1 to 50% by mass of the component (A), 5 to 40% by mass of the component (B), and 5 to 85% by mass of the component (C), based on a total mass of the components (A), (B) and (C), and further comprising the component (D) in an amount of 0.1 to 20 parts by mass per 100 parts by mass of a combination of the components (A), (B) and (C).

10. A cured product, obtained by photocuring the photocurable resin composition according to claim 1.

11. The cured product according to claim 10, having storage elastic modulus values and loss elastic modulus values at various temperatures that simultaneously satisfy ranges specified in (1) to (3) below:
- (1) at 70° C., a storage elastic modulus within a range from $1 \times 10^3$ to $1 \times 10^6$ Pa and a loss elastic modulus within a range from $1 \times 10^3$ to $1 \times 10^6$ Pa,
- (2) at 23° C., a storage elastic modulus within a range from $1 \times 10^4$ to $5 \times 10^6$ Pa and a loss elastic modulus within a range from $1 \times 10^4$ to $5 \times 10^6$ Pa, and
- (3) at 0° C., a storage elastic modulus within a range from $5 \times 10^4$ to $1 \times 10^7$ Pa and a loss elastic modulus within a range from $5 \times 10^4$ to $1 \times 10^7$ Pa.

12. A resin sheet member for forming a resin layer within a display device comprising a display member and an optical member disposed on a front surface of the display member with the resin layer interposed therebetween, wherein the sheet member comprises a first film, a resin sheet formed from the cured product according to claim 10 provided on top of the first film, and a second film provided on top of the resin sheet.

13. The resin sheet member according to claim 12, wherein the first film and the second film are both release-treated plastic films, wherein respective release force values for the first and second films are different.

14. A display device comprising a display member, and an optical member disposed on a front surface of the display member with a resin layer interposed therebetween, wherein the resin layer comprises the cured product according to claim 10.

15. A method for producing a resin sheet member for forming a resin layer within a display device comprising a display member and an optical member disposed on a front surface of the display member with the resin layer interposed therebetween, wherein the method comprises:
- a step of applying the photocurable resin composition according to claim 1 in a sheeted form to one surface of a first film, and subsequently covering the composition with a second film, and
- a step of curing the photocurable resin composition by irradiating light through a principal surface of at least one of the first film and the second film.

16. The method for producing a resin sheet member according to claim 15, wherein during the curing step, the irradiated light is ultraviolet light having a peak wavelength of 365 nm and comprising substantially no wavelengths less than 280 nm, and the ultraviolet light is irradiated for at least two minutes at an intensity of 0.01 to 20.0 mW/cm$^2$.

* * * * *